United States Patent [19]
Sudhoff

[11] Patent Number: 5,943,229
[45] Date of Patent: Aug. 24, 1999

[54] SOLID STATE TRANSFORMER

[75] Inventor: Scott D. Sudhoff, W. Lafayette, Ind.

[73] Assignee: ABB Power T&D Company Inc., Raleigh, N.C.

[21] Appl. No.: 09/089,063

[22] Filed: Jun. 2, 1998

[51] Int. Cl.[6] .................................................. H02M 7/00
[52] U.S. Cl. ............................................................ 363/125
[58] Field of Search .............................. 363/84, 89, 125, 363/127; 323/355, 361; 336/170, 171, 214, 215

[56] References Cited

U.S. PATENT DOCUMENTS

| | | | |
|---|---|---|---|
| 3,798,497 | 3/1974 | Manske | 315/28 |
| 4,024,565 | 5/1977 | Anthony et al. | 357/51 |
| 4,071,378 | 1/1978 | Anthony et al. | 148/1.5 |
| 4,204,237 | 5/1980 | Zocholl | 361/36 |
| 5,038,081 | 8/1991 | Maiale, Jr. et al. | 315/291 |
| 5,119,285 | 6/1992 | Liu et al. | 363/127 |
| 5,202,644 | 4/1993 | Poulsen | 336/5 |
| 5,270,910 | 12/1993 | Kile | 362/216 |
| 5,353,494 | 10/1994 | Bisbee et al. | 29/605 |
| 5,510,679 | 4/1996 | Maiale, Jr. et al. | 315/194 |
| 5,566,443 | 10/1996 | Allan et al. | 29/606 |

OTHER PUBLICATIONS

Henze, C.P. et al., "A Digitally Controlled AC to DC Power Conditioner That Draws Sinusoidal Input Current", *IEEE*, 1986, 531–540.

Reischi, P., *Proof Principle of the Solid State Transformer*, EPRI TR–105069, Project 8001–13, Final Report, 1995.

Venkataramanan, G. et al., "AC–AC Power Converters for Distribution Control", *NSF Symposium on Electric Power Systems Infrastructure*, Washington State University, Pullman, Washington, Oct. 27–29, 1994, pp. 159–162.

*Primary Examiner*—Matthew Nguyen
*Attorney, Agent, or Firm*—Woodcock Washburn Kurtz Mackiewicz & Norris LLP

[57] ABSTRACT

A solid state transformer having an input stage operatively coupled to an isolation stage. The input stage converts a high voltage, single phase AC input voltage to a plurality of unisolated DC output voltages. Each unisolated DC output voltage is at a voltage level which is less than the voltage level of the AC input voltage and each of the unisolated DC output voltages is separately isolated in the isolation stage.

24 Claims, 6 Drawing Sheets

SOLID STATE TRANSFORMER

FIELD OF THE INVENTION

The present invention relates generally to electrical transformers, and more particularly to a solid state distribution transformer.

BACKGROUND OF THE INVENTION

Distribution transformers range widely in power delivery capability and physical size. Ratings are as small as 1.5 kVA and as large as 500 kVA or up to 'small power' ratings of 2500 or 3000 kVA. The function of a distribution transformer is to reduce voltage on the medium utility system of from 2400 to 35000 down to utilization voltages of from 120 to 600 volts.

Transformers may be single phase devices or may be three phase devices, or may consist of single phase devices interconnected to supply three phase power. Distribution transformers can be oil-immersed, to provide better insulation and cooling or may be "dry-types" which are air-cooled, but will therefore be physically larger and require more weather protection than sealed, oil-immersed transformers.

Transformers generally contain two or more electrical circuits, primary and secondary windings, consisting of multiturn coils of electrical conductors that are interlinked by means of one or more magnetic circuits or cores. Cores typically consist of a plurality of ferromagnetic laminations that are stacked together to form a closed loop, surrounding and coupling magnetically the primary and secondary windings. Cores may be manufactured either from mutually overlapping or abutting individual laminations or from a continuous strip of magnetic sheet material wound around a mandrel to form a closed circuit. The magnetic and electric circuits are combined either by assembling the cores around pre-wound primary and secondary coils or by winding the conductor coils around one or more legs of the closed magnetic circuit. Examples of distribution transformers are disclosed by the following United States patents, although none of them relates to a solid state distribution transformer: U.S. Pat. No. 5,353,494, Oct. 11, 1994, "Method for Assembling a Distribution Transformer With Conforming Layers"; U.S. Pat. No. 5,202,664, Apr. 13, 1994, "Three Phase Transformer With Frame Shaped Winding Assemblies"; and U.S. Pat. No. 5,566,443, Oct. 22, 1996, "Methods of Making Power Distribution Transformers."

Conventional distribution transformers suffer from several undesirable characteristics:

1) they may require mineral oil or other liquid for cooling and as a dielectric medium or may require ventilation to the ambient air for cooling;

2) the output voltage is a function of the input voltage and output current, and there is no provision to regulate the voltage or to compensate for power quality problems such as load harmonics, power factor or DC offset; and 3) losses associated with energization of the core are present at all times and are independent of load. Efficiencies will approach zero for very small loads and will peak when supplying about 50% of nameplate rating. Lightly loaded transformers, therefore, are very inefficient.

In order to overcome some of these difficulties, previous researchers have proposed versions of a solid state transformer. See P. Reischi, *Proof of the Solid State Transformer*, EPRI TR-105069, Project 8001-13, Final Report, August 1995; and G. Venkataramanan, et al., *AC-AC Power Converters for Distribution Control*, presented at the NSF Symposium on Electric Power Systems Infrastructure, Washington State University, Pullman, Wash., Oct. 27–29, 1994. Most of this work appears to have been based on the topology depicted in FIG. 1, wherein bidirectional switches s1 and s2 are switched in a complementary fashion such that the voltage across s2, denoted $v_m$, is equal to either the input voltage, $v_{in}$, or 0. If the ratio of the time s1 is "on" (i.e., closed) to the total switching period is denoted k, then the effective value of $v_m$ is $kv_{in}$, which is the primary mechanism by which the voltage transformation is achieved. The L and C elements serve to filter out the high frequency switching harmonics from $v_m$.

The approach depicted in FIG. 1, however, is laden with difficulties. For example, the topology depends on complementary switching of switches s1 and s2. If, for example, s2 is closed ever so slightly before s1 is opened, the source voltage $V_{in}$ will be shorted, thus leading to a current spike. If s2 is closed slightly after s1 is opened, then for that instant there will be no path for the current in the filter inductor to flow, leading to a voltage spike. Since physical devices do possess an impedance and are not ideal switches, this approach is physically possible to implement but is nevertheless problematic and subject to high switching losses. Another disadvantage of this design is that, at the voltage levels needed to implement a distribution level transformer, semiconductors with appropriately high voltage ratings are not available. Series-connected devices must be used for this reason, but such devices are problematic in that device voltage ratings can be easily exceeded unless extreme care is taken to insure voltage sharing during switching transients. A further disadvantage is that, when implemented as a single stage, the semiconductors must be able to withstand both full primary voltage and full secondary current—a very expensive arrangement. Avoiding this difficulty requires using multiple cascaded stages but this can be problematic from a control perspective. In addition, the transformer depicted in FIG. 1 does not offer magnetic isolation. For these reasons, solid state transformers based on the design depicted in FIG. 1 do not appear to be practical.

The following United States patents disclose various aspects of a solid state transformer, but none relates to a solid state distribution transformer capable of handling voltage levels encountered by distribution transformers: U.S. Pat. No. 5,510,679, Apr. 23, 1996, "Reverse Phase-controlled Dimmer with Integral Power Adjustment Means"; U.S. Pat. No. 5,270,910, Dec. 14, 1993, "Neon Light Box"; U.S. Pat. No. 5,038,081, Aug. 6, 1991, "Reverse Phase-controlled Dimmer"; U.S. Pat. No. 4,204,237, May 20, 1980, "Solid State Transformer Differential Relay"; U.S. Pat. No. 4,071,378, Jan. 31, 1978, "Process of Making a Deep Diode Solid State Transformer"; and U.S. Pat. No. 4,024,565, May 17, 1977, "Deep Diode Solid State Transformer."

SUMMARY OF THE INVENTION

Accordingly, a primary object of the present invention is to provide an improved solid state transformer (SST) capable of use as a distribution transformer. A presently preferred embodiment of a solid state distribution transformer in accordance with the present invention comprises an input stage coupled to an isolation stage. The input stage converts a high voltage, single phase AC input voltage to a plurality of, or N, unisolated DC output voltages, where each unisolated DC output voltage is at a voltage level which is less than the voltage level of the peak SST AC input voltage. In addition, each of the unisolated DC output voltages is separately isolated in the isolation stage.

In a presently preferred embodiment of the invention, the input stage comprises N input modules having input ports, each comprising two input terminals, coupled in series such that a first module and a last module are coupled to receive the AC input voltage on one input terminal and further coupled by another input terminal to an input terminal of an adjacent input module. Each input module other than the first and last modules is coupled by two input terminals to two adjacent input modules. Moreover, each input module further comprises an output port, and the isolation stage comprises N isolation modules each having an input port and an output port; and the output port of each input module is coupled to an input port of a corresponding isolation module. Further, the respective output ports of the isolation modules are coupled together in parallel to provide an isolated bipolar DC voltage supply.

The preferred embodiment also includes an output module coupled to the isolation stage. The output module provides the desired AC output voltages (normally approximately plus and minus 120 VAC) at the desired frequency (normally 60 Hz or 50 Hz). In general, the SST may be designed to accept a wide range of input voltages and to provide a wide range of output voltages with any combination of frequencies.

Preferably, each isolation stage module comprises means for providing magnetic isolation between its input and output voltages. The isolation provided by the isolation modules permits the isolation stage modules, series connected at their inputs, to be parallel connected at their outputs, whereby voltage reduction is provided.

Other features and advantages of the present invention will be apparent from the following detailed description of preferred embodiments.

BRIEF DESCRIPTION OF THE DRAWINGS

FIG. 6 illustrates input stage control;

FIG. 7 illustrates the input stage control voltage regulator;

FIG. 8 illustrates the input stage control voltage observer;

FIG. 9 shows the input stage control current command synthesizer;

FIG. 10 depicts an input stage control duty cycle synthesizer;

FIG. 11 depicts the isolation stage control; and

FIG. 12 depicts the output stage leg control of the presently preferred embodiment.

DETAILED DESCRIPTION OF PREFERRED EMBODIMENTS

Figure 1:
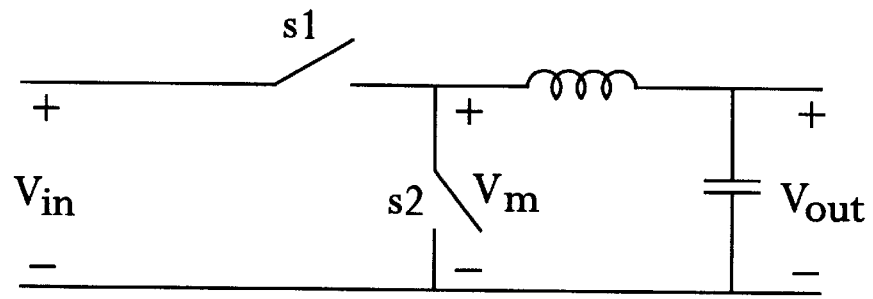
FIG. 1 depicts the topology of an early solid state transformer (SST).
Figure 2:
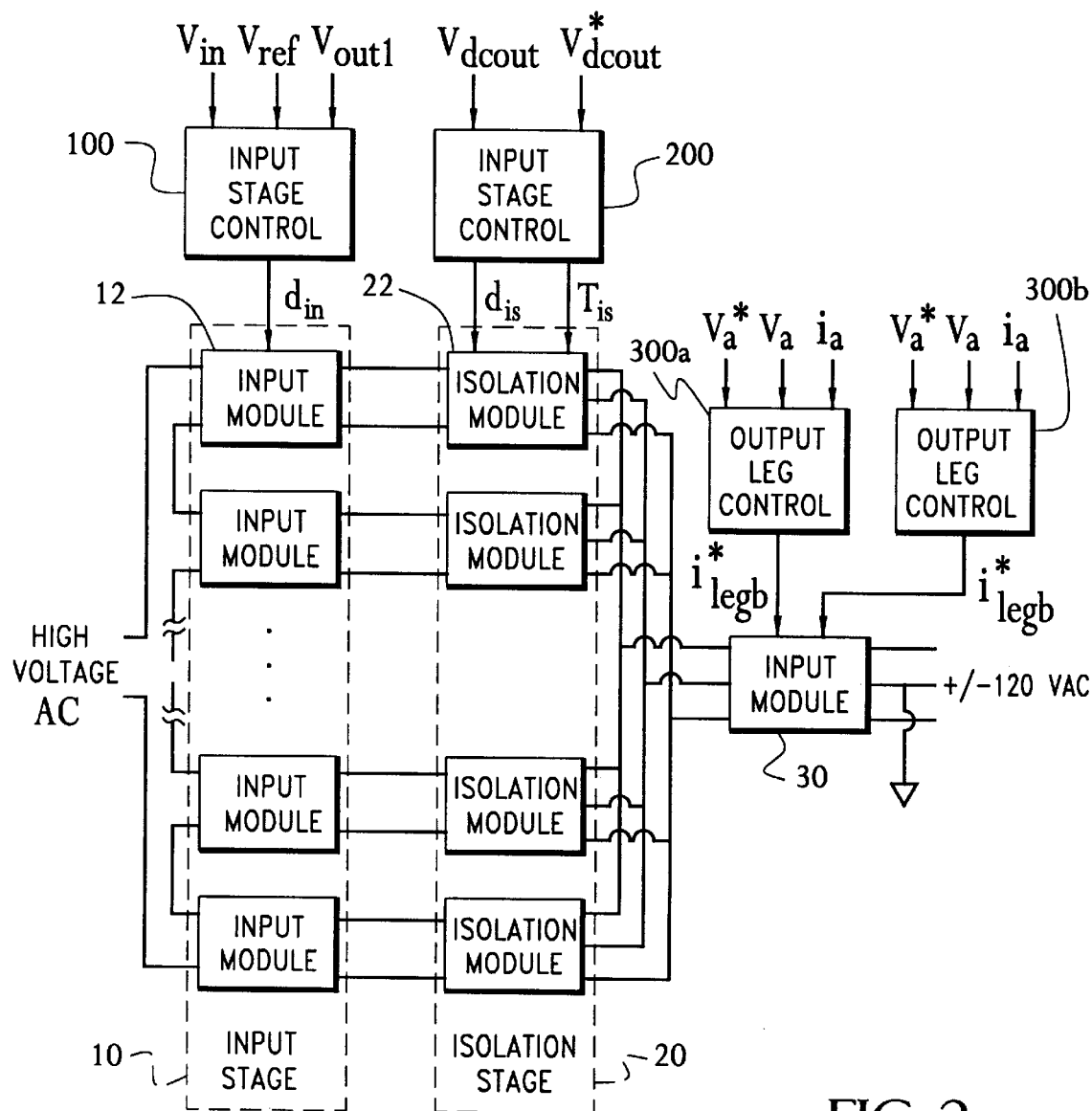
FIG. 2 schematically depicts an SST in accordance with the present invention.

A solid state transformer in accordance with the present invention is schematically depicted in FIG. 2. The topology shown includes three stages—an input stage 10, an isolation stage 20, and an output stage 30. The function of the input stage is to convert power from high voltage, single phase AC to N DC ports, where N is the number of input stage modules 12. Controllers 100, 200 and 300, explained in greater detail below with reference to FIGS. 6–12, may be implemented as separate control circuits or as a software controlled microprocessor or digital signal processor (DSP), or the like.

Figure 3:
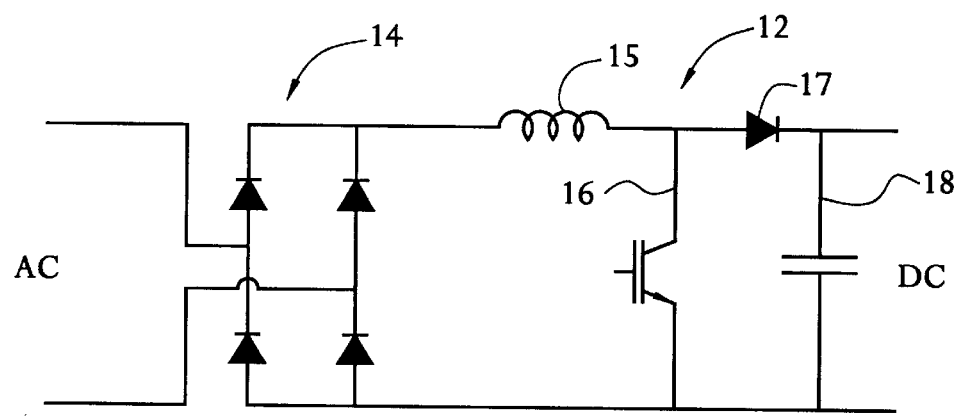
FIG. 3 depicts an input stage module for an SST in accordance with the present invention.

A presently preferred topology for each input stage module 12 is depicted in FIG. 3. As shown, each input stage module 12 includes a single phase full bridge rectifier 14 coupled to what is essentially a boost converter, comprising inductor 15, transistor 16, diode 17 and output capacitor 18. The transistor 16 is switched at a predetermined frequency and the duty cycle is controlled so as to cause the current in the inductor 15 to take the form of a rectified sinewave, which causes the AC current into the rectifier 14 to be sinusoidal. Note that the converter used in each module is based on the topology shown in C. P. Heinz and N. Mohan, *A Digitally Controlled AC/DC Power Conditioner that Draws Sinusoidal Input Current*, IEEE PESC Conference Record, 1986, pp. 531–540. However, the proposed design is an extension of the prior design in the use of N modules instead of a single module, which avoids the use of series connected devices in high voltage applications. In addition, the switching of the individual transistors is coordinated so that the effective switching frequency is N times the actual switching frequency. This provides a mechanism to provide very low distortion in the AC current into the rectifier while maintaining a low actual switching frequency, which in turn results in high efficiency through minimization of the switching losses.

The output of each of the N input stage modules 12 is fed into the input of a corresponding isolation stage module 22. The primary function of the isolation stage 20 is to provide magnetic isolation. In addition to providing input/output isolation for the transformer (a desirable characteristic), the isolation provided also permits the isolation stage modules 22, which are series tied on the input side as shown in FIG. 2, to be parallel tied on the output stage, which provides a convenient method for achieving the bulk of the voltage reduction.

Figure 4:
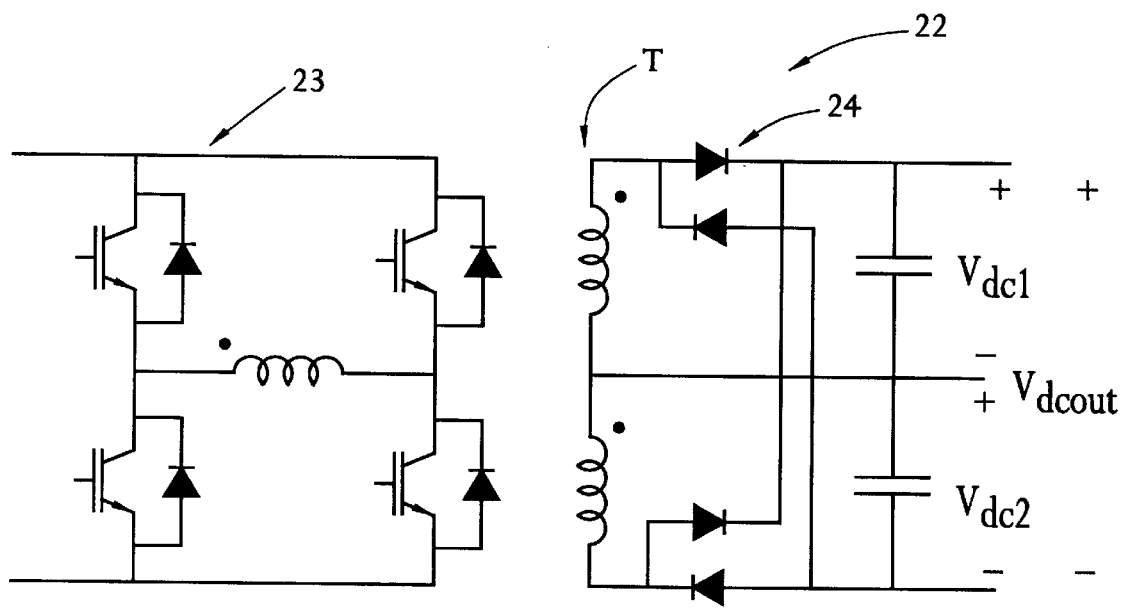
FIG. 4 depicts an isolation stage module for an SST in accordance with the present invention.

A presently preferred construction of an isolating DC/DC converter is depicted in FIG. 4. In this converter, the DC input is converted to a high frequency AC square wave, fed into a ferrite core-based transformer T (which is small due to the high frequency) and then rectified in such a way as to provide a bipolar DC output. Both the frequency and duty cycle (the amount of time the voltage is non zero over the period of the waveform) are varied so as to optimize efficiency for a given load. Within this design it is expected that the isolation transformers themselves could advantageously be constructed using a single core in a production unit. However, separate cores may be used in order to facilitate construction with commercially available parts.

Figure 5:
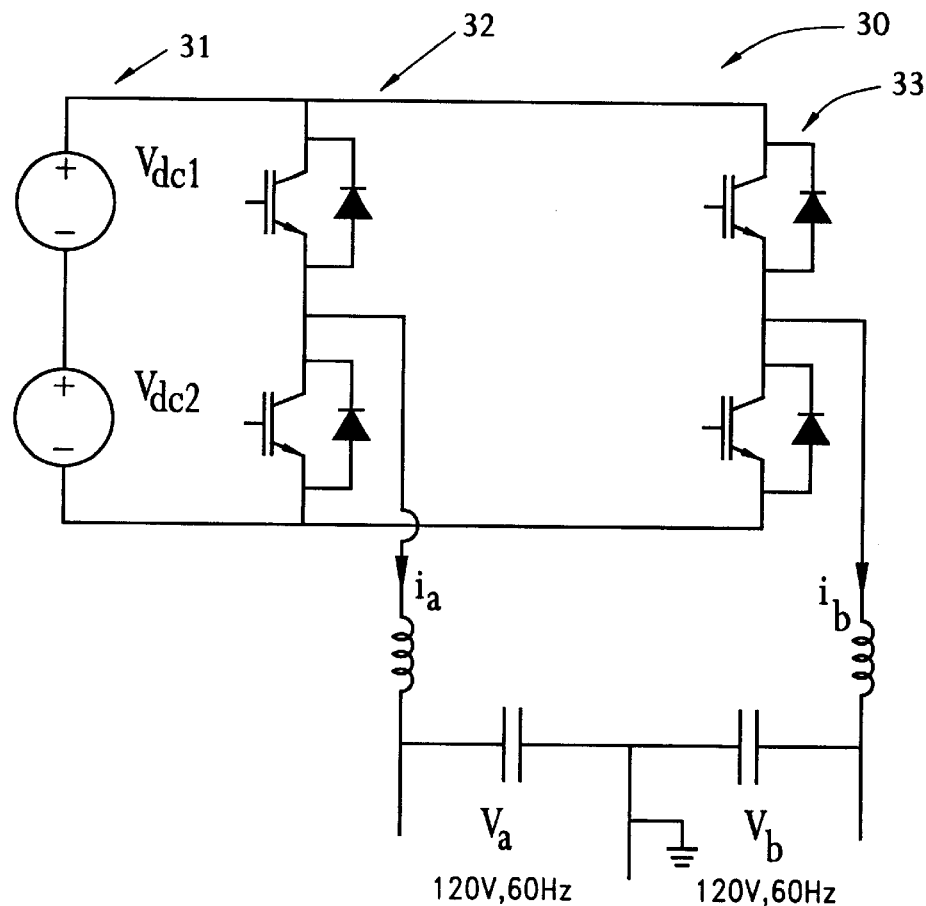
FIG. 5 depicts an output stage module for an SST in accordance with the present invention.

The output stage 30 is depicted in FIG. 5. The function of the output stage is to convert from relatively low voltage bipolar DC (a few hundred volts) to low voltage, 60 Hz AC, with a grounded secondary midtap. Switching is based on a hysteresis current control algorithm, where the current command is obtained from a feedforward type voltage regulator. The algorithm automatically compensates for load harmonics and has a built in current limit.

A more detailed discussion of the operation of the solid state transformer (SST) will now be provided.
SST Control Algorithms There are three main control algorithms for the SST, one for the input stage 10, one for the isolation stage 20, and one for the output stage 30. These three control algorithms act independently.

Figure 6:
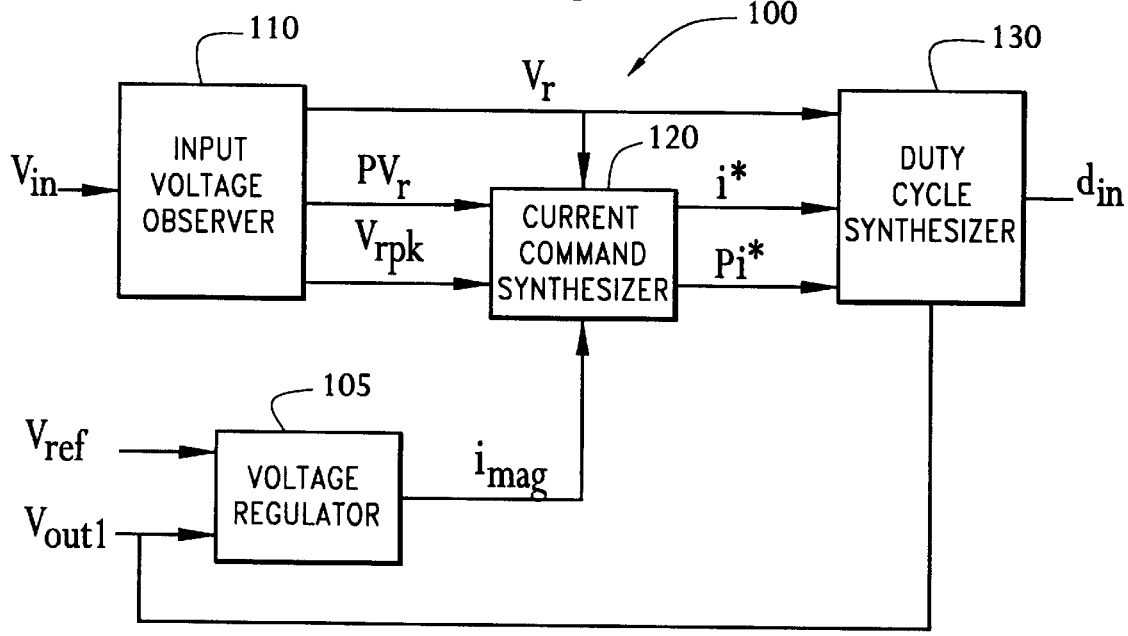
FIGS. 6–12 depict presently preferred algorithms for controlling an SST in accordance with the present invention.

FIG. 6 illustrates the input stage control. The function of this control is to switch the input stage module semiconductors so as to regulate the input stage DC output voltages and at the same time to insure that the AC input stage input current is sinusoidal and in phase with the input voltage. As can be seen, this control consists of four sub-algorithms—a voltage regulator 105, an input voltage observer 110, a current command synthesizer 120, and a duty cycle synthesizer 130.

Figure 7:
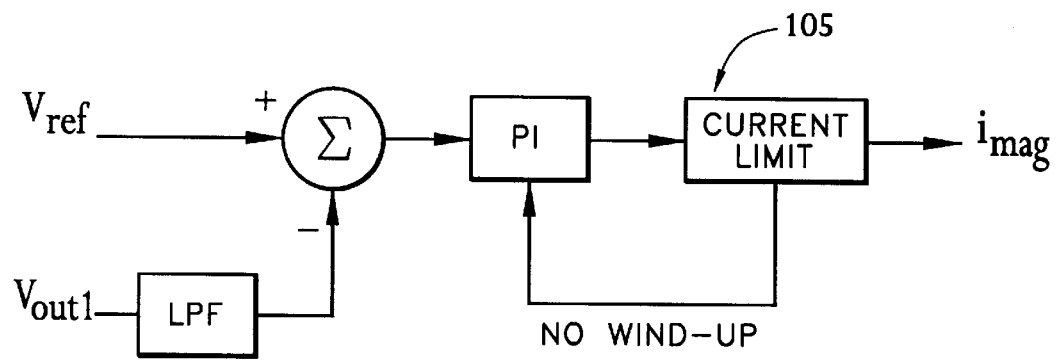

The primary regulatory action of the control is accomplished by the voltage regulator 105 illustrated in FIG. 7. Therein, the output voltage $v_{out1}$ of the lowest input stage module 12 is measured and then filtered. The filtered quantity is then compared to a reference voltage $v_{ref}$, and the error is an input to a proportional plus integral (PI) type control. The output of the PI block is then current limited, and the output of the current limit is the desired zero-to-peak amplitude of the input current. In the case that the current limit is reached, an anti-windup routine is used to prevent wind up of the PI integrator. The remainder of the input stage control sub-systems are to achieve an input current with the desired waveshape (sinusoidal) with the desired amplitude ($i_{mag}$).

Figure 8:
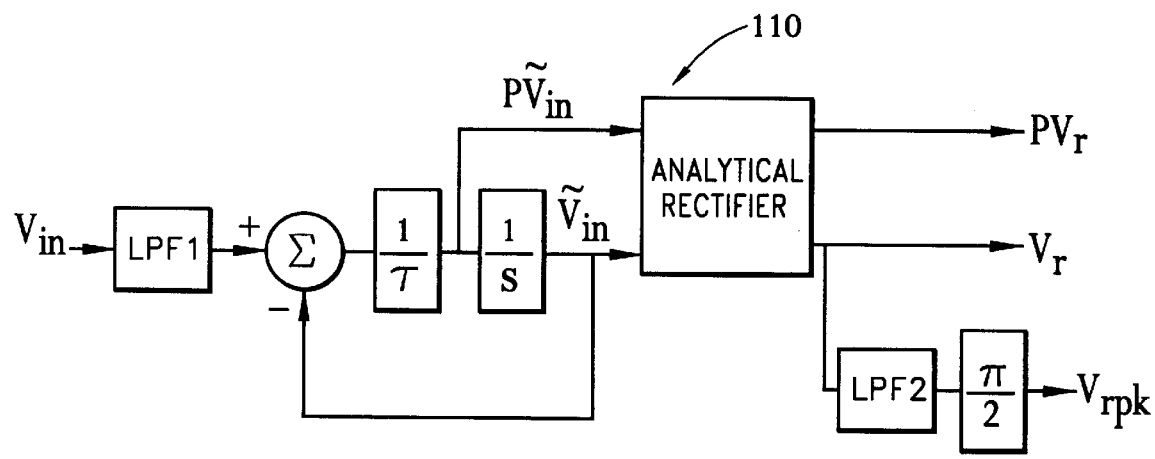

The first of the controls used to achieve the desired input current is the input voltage observer 110 (FIG. 8). The function of input voltage observer is threefold. First, it determines an idealized half rectified voltage $v_r$ which corresponds to the instantaneous value of the fundamental component of the input voltage ($v_{in}$) after it has been passed through an idealized rectifier. In addition, it also determines the time derivative of this quantity, denoted $pv_r$, as well as the peak value of $v_r$ over a cycle, denoted $v_{rpk}$. A block diagram of this control is depicted in FIG. 8. Therein, the low pass filter LPF 1 comprises a series of three first order low pass filters which have a time constant and gain such that, at a frequency of 60 Hz, the collective output of the filters has a gain of unity and a phase shift of 180 degrees. LPF 1 also utilizes a negative unity gain block so that the output of this block ($\tilde{v}_{in}$) is actually in phase with the input voltage, though with most of the harmonic content removed. A fourth first order filter with a fast time constant ($\tau$) is used to estimate the derivative of the filtered input voltage (denoted $p\tilde{v}_{in}$). The time constant of this filter is such that negligible phase shift occurs at 60 Hz. Next, an "analytical rectifier" is used to determine the output of an idealized rectification of the filtered input voltage. This is used to determine the idealized rectifier voltage $v_r$ as well as the idealized time derivative of the rectified voltage $pv_r$. The idealized rectifier voltage $v_r$ is also fed through another low pass filter (LPF 2) in order to determine its average value, which is then multiplied by $\pi/2$ in order to determine the peak value of $v_r$ over a cycle.

Figure 9:
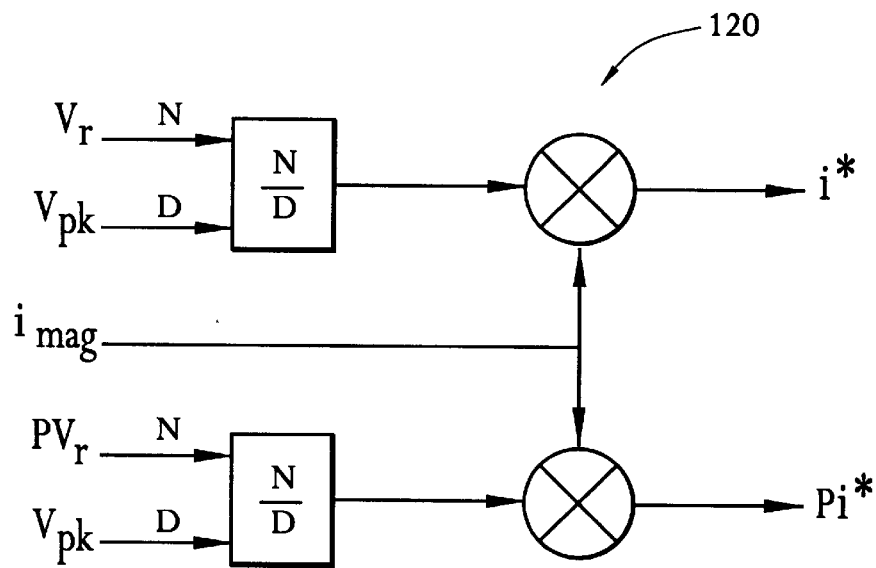

Based on the outputs of the input voltage observer 110 and the voltage regulator 105, the current command synthesizer 120 determines the instantaneous current command, i* as well as the time derivative of that command, pi* as shown in FIG. 9. These quantities are determined such that the peak value of i* is equal to the desired magnitude $i_{mag}$ and that i* which is the commanded input stage module inductor current, is a rectified sinusoid. If the actual input stage module inductor current is equal to this value, it follows that the input current will be a sinusoid with a peak value of $i_{mag}$.

Figure 10:
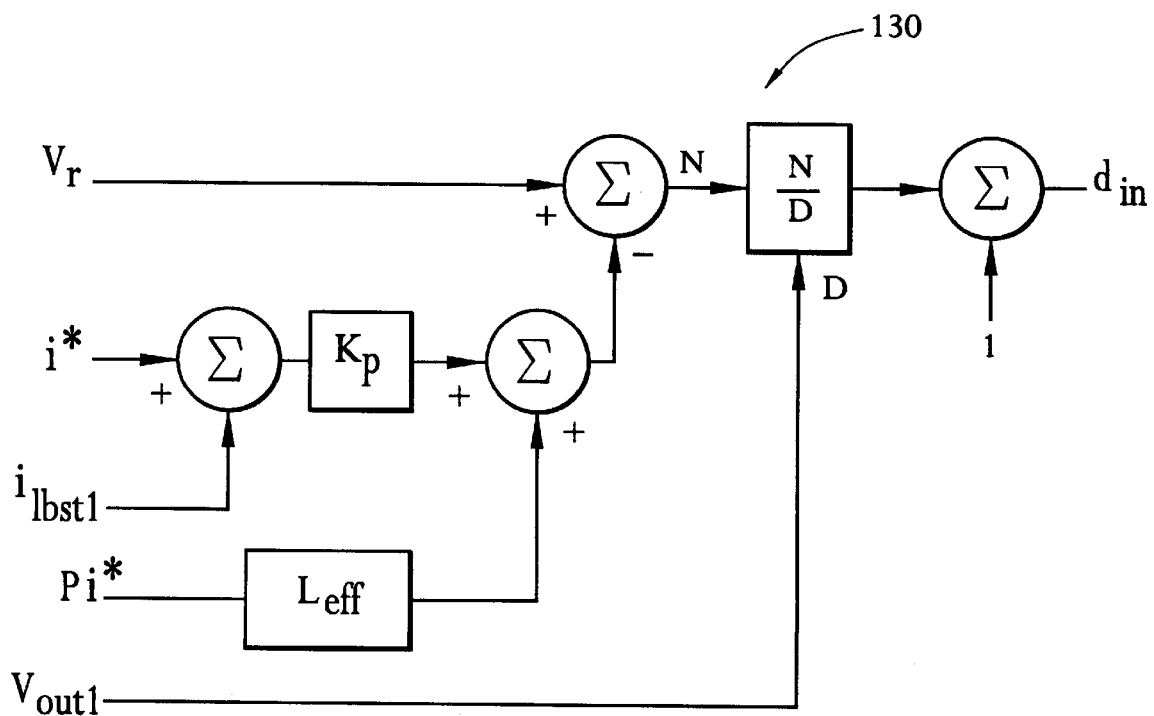

The last aspect of the input stage control is the duty cycle synthesizer 130 shown in FIG. 10. The function of this control is to determine the duty cycle ($d_{in}$) of the input stage modules such that the input stage module inductor current, $i_{lbst1}$, is equal to the current command i*. As can be seen, this is based on the idealized rectifier voltage $v_r$, the instantaneous current command i* as well as its time derivative pi*, the input stage inductor current $i_{lbst1}$, and the DC output voltage of the first input stage module $v_{out1}$. Based on the commanded duty cycle, the amount of time each transistor is on in each module per switching cycle may be readily calculated. It should be noted that the switching of each module is staggered so that the effective switching frequency is equal to the number of modules times the base switching frequency.

Figure 11:
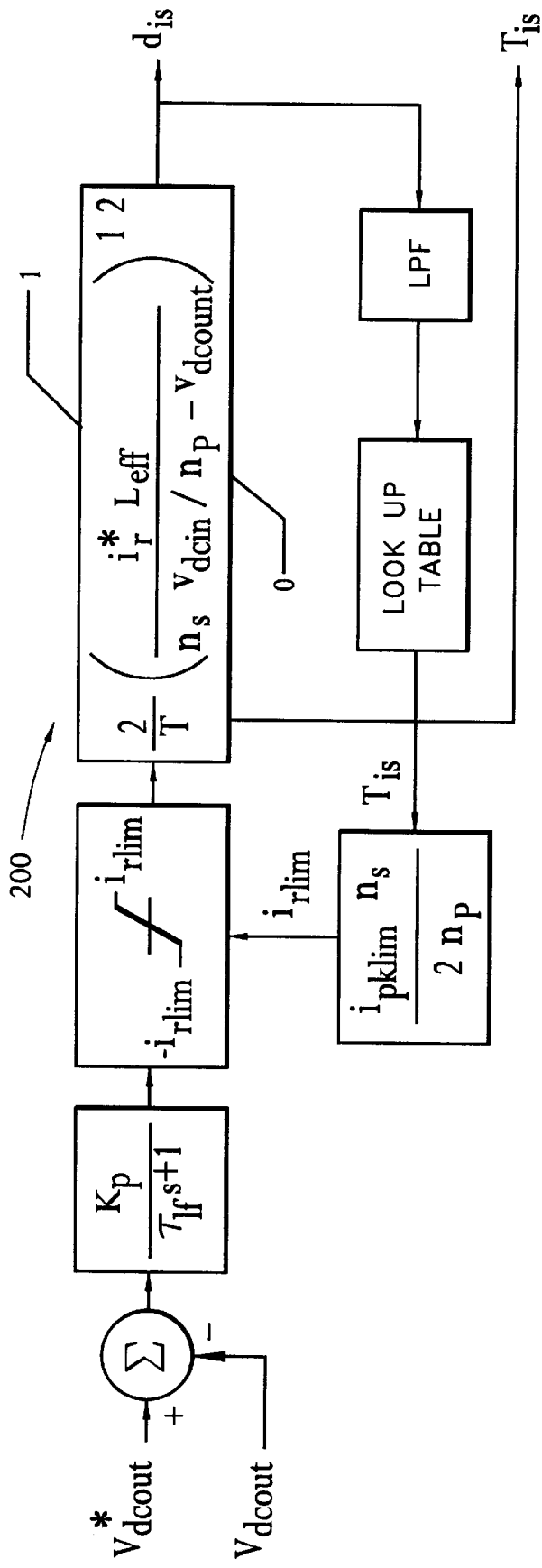
Figure 12:
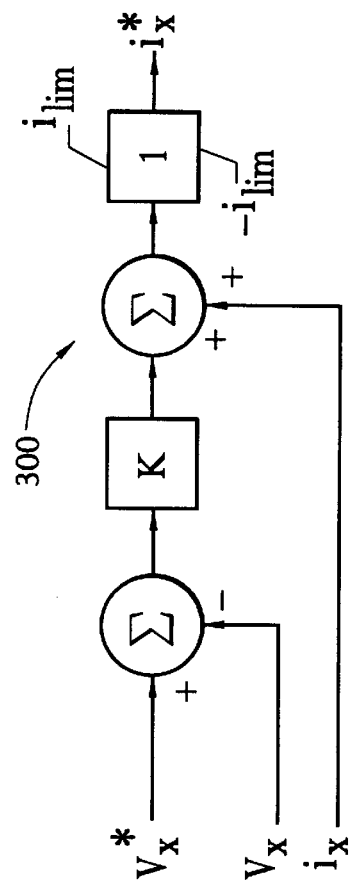
Figure 11:
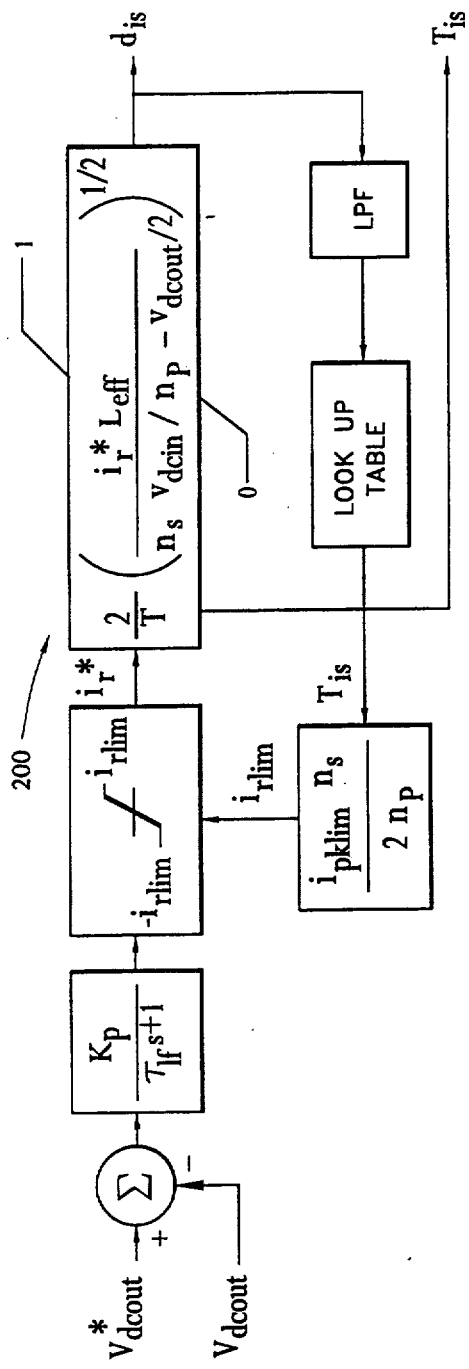
Figure 12:
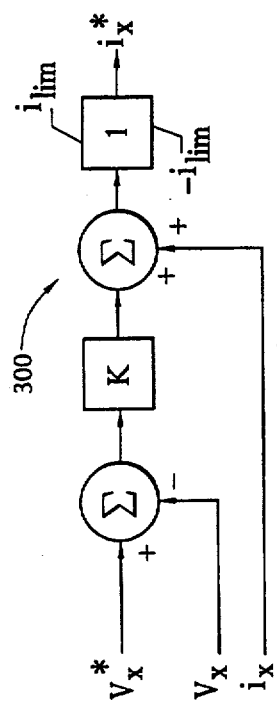
Figure 5:
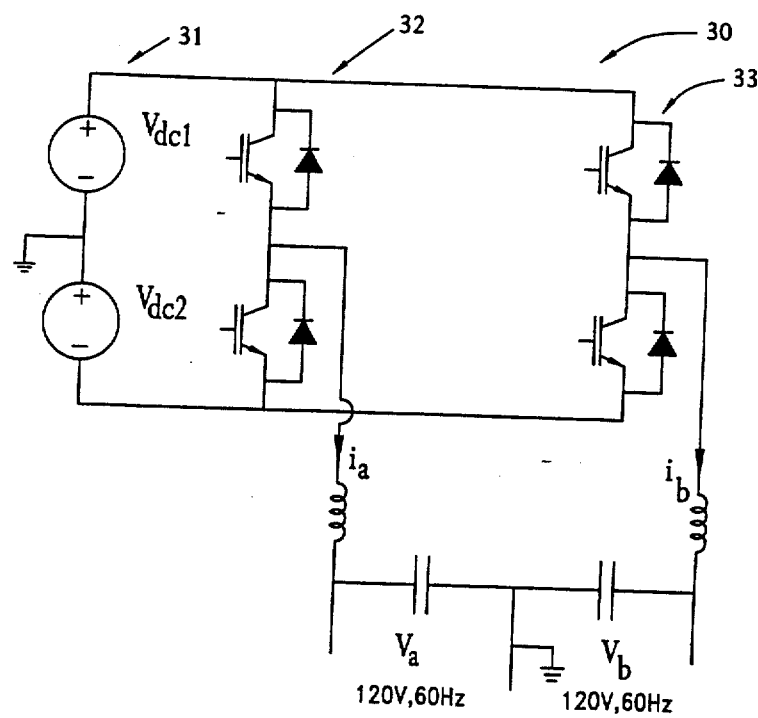
Figure 6:
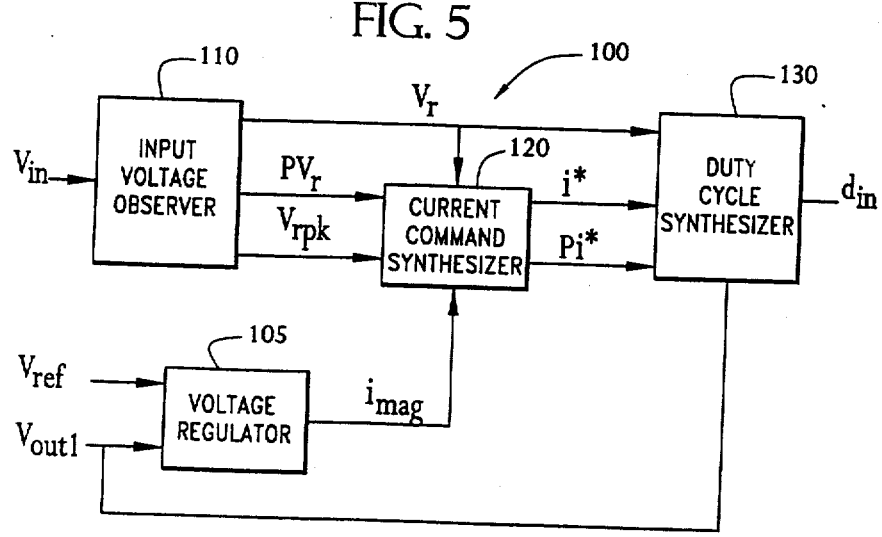
Figure 1:
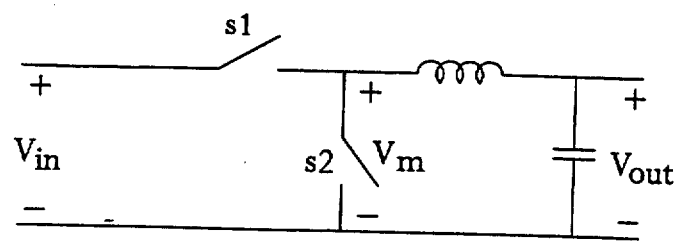
Figure 2:
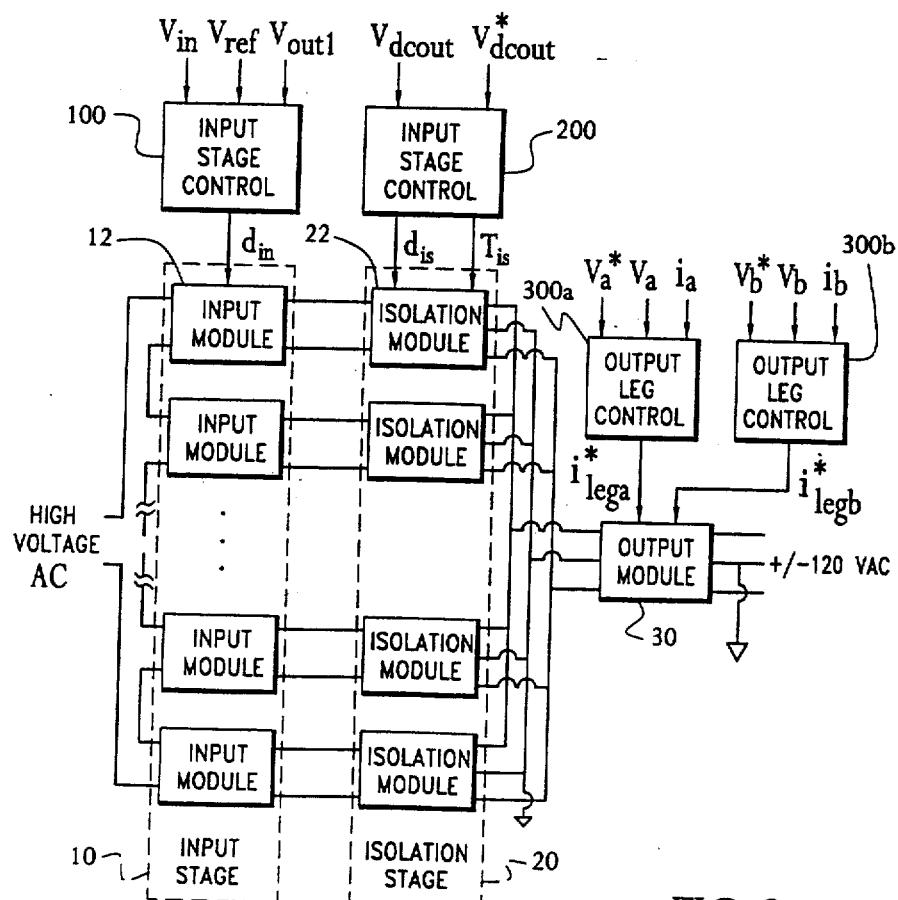

FIG. 11 depicts the isolation stage control 200. The principal variables in this control are the isolation stage output voltage $V_{dcout}$, the commanded output voltage $v^*_{dcout}$, the isolation stage master input module DC input voltage, $v_{dcin}$ (which is equal to the input module output voltage $v_{out1}$), the secondary rectifier output current command, $i^*_r$, the secondary rectifier output current limit, $i_{rlim}$, the duty cycle $d_{is}$ and the switching period $T_{is}$. Parameters include the lag filter time constant, $\tau_{lf}$, the lag filter gain $K_p$, the number of isolation stage transformer secondary turns, $n_s$, the number of isolation stage transformer primary turns, $n_p$, the effective transformer leakage inductance seen from the secondary side $L_{eff}$, and the H-bridge transistor peak current limit $i_{pklim}$.

In the isolation stage 120 (FIG. 2), the converter semiconductors are switched such that the primary side voltage on the isolation voltage takes on a value of $v_{dcin}$, 0, $-v_{dcin}$, 0 and then repeats. The period of this repetition is denoted $T_{is}$. The duty cycle ($d_{is}$) is defined as the amount of time the primary voltage is nonzero divided by the switching period $T_{is}$. The function of the isolation stage is to control the duty cycle $d_{is}$ and period $T_{is}$ such that the isolation stage output voltage $V_{dcout}$ is equal to its commanded value $V^*_{dcout}$ in such a way as to achieve maximum isolation stage efficiency.

The operation of the isolation stage control, is as follows. First the output voltage command ($v^*_{dcout}$) is compared with the actual voltage ($v_{dcout}$) and the error is fed through a first order lag transfer function, whose output is a current command, which is limited to the variable current limit, $i_{rlim}$ (this is an average current limit which is calculated such that a peak current limit is approximately achieved). Based on the limited current command, a duty cycle command that ($d_{is}$) will approximately achieve that current is computed and bounded to values between 0 and 1. The duty cycle is directly used to compute the relative amount of time the transistors in the H-bridge 236 (FIG. 4) of the isolation stage should be on. In addition, the duty-cycle is fed through a low pass filter (LPF), and the result is an input to a look up table, whose input is the filtered duty cycled and whose output is the switching period $T_{is}$. This look up table is created such that maximum efficiency is obtained for a given operating condition. Given that switching period $T_{is}$ and the duty cycle $d_{is}$, the switching of the H-bridge semiconductors is readily determined. In addition, based on the switching period $T_{is}$, the current limit $i_{rlim}$ is calculated.

The output stage control 300 comprises two independent but identical controls that each control one phase leg of the output stage 30 (FIG. 5). The output stage leg control is depicted in FIG. 11. Therein, $V^*_x$ (where x is "a" for the a-phase leg and "b" for the b-phase leg) is the commanded output voltage of one line-to-midtap voltage, which is commanded to be a sinusoid of the desired frequency. This is compared to the corresponding line-to-midtap voltage, and the error is multiplied by a constant of proportionality and then added to the measured output current $i_x$ and then limited to $\pm i_{lim}$. The resulting value is the leg current command $i^*_x$, which is achieved using a hysteresis current regulator.

Gate Drive Control of Transistors

Gate drive circuits of the type that may be employed in practicing the present invention are well known, and need not be described in detail herein. However, the following remarks should be considered in designing a specific embodiment of the present invention.

Although the gate drive circuits are standard, the preferred embodiment of the inventive SST has some special features in regard to the power supply and signal transfer from the controls to the gate drive circuits. Power for the gate drive circuits is derived from the SST output. In particular, a low-power 60-Hz transformer, similar to the one found on PCS, etc., is connected to the SST output. The 60-Hz low-voltage step down transformer output is then rectified to provide a low-voltage DC source. This source is used to feed an inverter whose output is connected to a low-power high-frequency transformer to provide a low-voltage, high-frequency (20–40 kHz) AC source. The low-voltage, high-frequency AC is used as an internal-power source for all the sensing, control, and gate drive electronics. Each of these devices interfaces to the low-voltage high-frequency distribution system through a small low-power transformer. Startup power is provided by a battery on the low voltage DC link.

Because of the large potentials existing between various modules in the SST, one problem that arises is that the internal-power transformers (which are very small because they are very low power and operate at very high frequencies) would normally have to provide over 10 kV of isolation. The spacing requirements to achieve this would normally make the interface transformers undesirably large. To alleviate this problem, a cascade of transformers is used to supply power to the input and isolation stage modules (the output stage has its own gate drive and control internal-power transformer connection since it is at a low potential relative to the internal power supply). In this arrangement, the first transformer of the cascade connects to the internal power supply. It has multiple secondary windings to provide magnetically isolated internal power to all gate drives and sensors associated with the first isolation and input stage modules. It has another secondary winding connected to the primary winding of the second internal-power distribution transformer in the cascade, which in turn has secondary windings that provide isolated power to all internal loads on the second input and isolation stage modules and a secondary winding to provide power to the transformer of the third module. This arrangement continues until all modules are provided for. An advantage of this arrangement is that the isolation level builds as the voltage level goes up, and so each internal power distribution transformer need only to be able to provide isolation between stages, not from the highest potential stage to the lowest potential stage.

The use of cascaded isolation is also used in regard to the control signals with the isolation and input stages. Normally, isolation between the controls and the power stage could be achieved using opto-isolator integrated circuits (ICs). Unfortunately, these devices are not available with ratings sufficient for the SST. Fiber optics offer almost infinite isolation but they are expensive. As a solution to this problem, the preferred embodiment of the SST makes use of a cascaded control signal system wherein the first module (both input and isolation) can communicate with the controls using opto-isolators (since they are at similar potentials). The first module communicates with the second, the second with the third, and so on, with each connection making use of an additional opto-isolator providing the additional voltage isolation needed to go one level higher. Opto-isolator ICs are adequate for this application because the isolation being provided is only that between stages. Because of the structure of the controls, only four signals need to be passed through the input and isolation stage modules in this way. These signals include the input stage duty cycle, an input stage synchronization signal (used to insure that each module switches at the correct time to achieve the desired multiplication in the effective switching frequency), and two signals describing the switching state of the isolation stage switching devices.

In sum, the solid state distribution transformer disclosed herein provides transformation between voltage levels through the use of power electronic converters rather than through the use of magnetics, although a high frequency isolation transformer is also used. When compared to conventional distribution transformers, the advantages of an SST in accordance with the present invention include: (i) no mineral oil is needed; (ii) it is expected to weigh less; (iii) it is expected to be smaller; (iv) it mitigates all power quality issues at the load (i.e., it can compensate for non-sinusoidal loads, DC offset loads, input voltage variation, input voltage distortion); and (v) it provides unity power factor at the transformer's input regardless of the power factor at the transformer's output. In addition, the input and output frequencies do not have to be the same, which could be advantageous, e.g., on a U.S. military base residential area in European countries. Further, the output stage could be changed to provide three-phase power. The SST also features a DC bus capable of supporting motor drives and may also be readily interfaced to energy storage devices (such as batteries) for operation as an uninterruptable power supply.

The scope of protection of the following claims is not intended to be limited to the presently preferred embodiments disclosed above. There are, e.g., possible variations in the preferred embodiments that may be implemented without departing from the true spirit of the invention. For example, the isolation stage 20 may be replaced by any type of isolating DC/DC converter. In addition, the inventor anticipates that the isolation transformers T of all of the isolation stage modules 22 could actually be combined into a single high frequency transformer with multiple secondaries and a single center tapped primary. Additional possible design modifications include using soft switching converters in the isolation stage 20, and the use of either soft switching or multi-level converters in the output stage.

Moreover, embodiments of the invention could be designed for almost any input voltage by adding additional input stage modules. In regard to output voltage, the only limitation is the voltage rating of the output stage semiconductors. With today's commonly available 1200 V devices, up to +/−400 V would be easy to achieve. With somewhat less available 1800 V devices, +/−600 V should be achievable with little modification. If one takes advantage of a multi-level design, the output voltage could be further increased. In regard to frequency, the maximum switching frequency somewhat drives this concern. With presently available semiconductor technology, up to about 400 Hz is achievable. These numbers will change with time as new and better semiconductors become available.

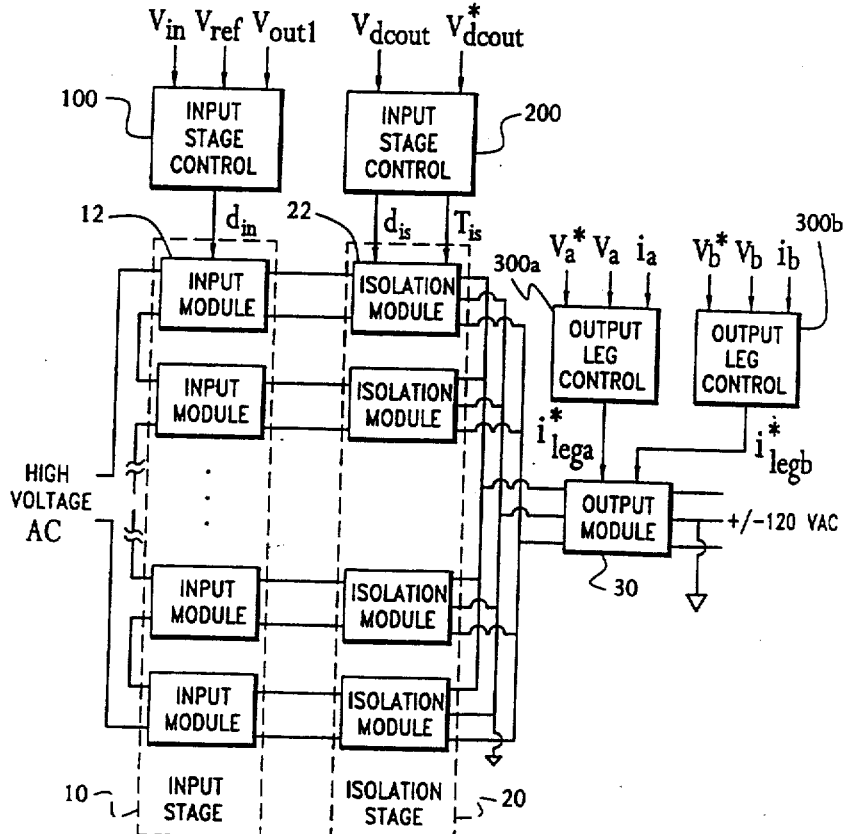

I claim:

1. A solid state transformer, comprising an input stage operatively coupled to an isolation stage; wherein said input stage converts a high voltage, single phase AC input voltage to a plurality of (N) unisolated DC output voltages, each said unisolated DC output voltage being at a voltage level which is less than the voltage level of said AC input voltage, and wherein each of said unisolated DC output voltages is separately isolated in said isolation stage.

2. A solid state transformer as recited in claim 1, wherein said input stage comprises N input modules having input ports, each comprising two input terminals, coupled in series such that a first module and a last module are coupled to receive said AC input voltage on one input terminal and further coupled by another input terminal to an input terminal of an adjacent input module; and wherein each input module other than said first and last modules is coupled by two input terminals to two adjacent input modules.

3. A solid state transformer as recited in claim 2, wherein each said input module further comprises an output port; wherein said isolation stage comprises N isolation modules each having an input port and an output port; wherein the output port of each said input module is coupled to an input port of a corresponding isolation module; and wherein the respective output ports of said isolation modules are coupled together in parallel to provide an isolated bipolar DC voltage source.

4. A solid state transformer as recited in claim 1, further comprising an output module having an input port coupled to said isolation stage, and an output port providing AC output voltages of plus and minus a prescribed AC voltage.

5. A solid state transformer as recited in claim 3, further comprising an output module having an input port coupled to said output ports of said isolation modules so as to receive said isolated bipolar DC voltage.

6. A solid state transformer as recited in claim 5, wherein said output module further comprises means for providing AC output voltages of plus and minus a prescribed AC voltage.

7. A solid state transformer as recited in claim 3, wherein each said isolation stage module comprises means for providing magnetic isolation between its input and output voltages.

8. A solid state transformer as recited in claim 7, wherein the isolation provided by said isolation modules permits the isolation stage modules, series connected at their inputs, to be parallel connected at their outputs, whereby voltage reduction is provided.

9. A solid state transformer as recited in claim 3, wherein each said input module further comprises a rectifier operatively coupled to said input terminals, and a boost converter coupled to output terminals of said rectifier.

10. A solid state transformer as recited in claim 9, wherein said boost converter includes a transistor that is switchable at a predetermined frequency and with a duty cycle that is controllable so as to cause an AC input current into the rectifier to be sinusoidal.

11. A solid state transformer as recited in claim 10, wherein the respective transistors of said boost converters are switchable in a coordinated fashion so that the effective switching frequency is N times the actual switching frequency, whereby low distortion in the AC current into the rectifier is provided while maintaining a low actual switching frequency, thus resulting in high efficiency through minimization of switching losses.

12. A solid state transformer as recited in claim 3, wherein each said isolation module comprises an isolating DC/DC converter.

13. A solid state transformer as recited in claim 12, wherein each said DC/DC converter converts a DC input to a high frequency AC square wave signal that is fed into a ferrite core-based transformer, and wherein the output of said transformer is rectified.

14. A solid state transformer as recited in claim 13, wherein a switching and duty cycle of said DC/DC converter are controllable so as to optimize efficiency for a given load.

15. A solid state transformer as recited in claim 14, wherein the transformers of said isolation modules are constructed using a single core that is shared by the respective modules.

16. A solid state transformer as recited in claim 1, further comprising an output module comprising means for converting a low voltage bipolar DC input to a low voltage, 60 Hz AC output.

17. A solid state transformer as recited in claim 16, wherein said output module further comprises a grounded secondary midtap output port providing +/−120 VAC.

18. A solid state transformer as recited in claim 1, wherein:

said input stage comprises N input modules having input ports, each comprising two input terminals, coupled in series such that a first module and a last module are coupled to receive said AC input voltage on one input terminal and further coupled by another input terminal to an input terminal of an adjacent input module; and wherein each input module other than said first and last modules is coupled by two input terminals to two adjacent input modules;

wherein each said input module further comprises an output port; wherein said isolation stage comprises N isolation modules each having an input port and an output port; wherein the output port of each said input module is coupled to an input port of a corresponding isolation module; and wherein the respective output ports of said isolation modules are coupled together in parallel to provide an isolated DC voltage;

further comprising an output module having an input port coupled to said isolation stage, and an output port providing AC output voltages of approximately plus and minus 120 VAC;

wherein each said isolation stage module comprises means for providing magnetic isolation between its input and output voltages.

19. A solid state transformer as recited in claim 18, wherein each said input module further comprises a rectifier operatively coupled to said input terminals, and a boost converter coupled to output terminals of said rectifier, said boost converter including a transistor that is switchable at a high frequency and with a duty cycle that is controllable so as to cause an AC input current into the rectifier to be sinusoidal.

20. A solid state transformer as recited in claim 19, wherein the respective transistors of said boost converters are switchable in a coordinated fashion so that the effective switching frequency is N times the actual switching frequency, whereby low distortion in the AC current into the rectifier is provided while maintaining a low actual switching frequency, thus resulting in high efficiency through minimization of switching losses.

21. A solid state transformer as recited in claim 18, wherein each said isolation module comprises an isolating DC/DC converter.

22. A solid state transformer as recited in claim 21, wherein each said DC/DC converter converts a DC input to a high frequency AC square wave signal that is fed into a ferrite core-based transformer, and wherein the output of said transformer is rectified.

23. A solid state transformer as recited in claim 22, wherein a switching and duty cycle of said DC/DC converter are controllable so as to optimize efficiency for a given load.

24. A solid state transformer as recited in claim 23, wherein the transformers of said isolation modules are constructed using a single core that is shared by the respective modules.

* * * * *

UNITED STATES PATENT AND TRADEMARK OFFICE
CERTIFICATE OF CORRECTION

PATENT NO. : 5,943,229
DATED : August 24, 1999
INVENTOR(S) : Scott D. Sudhoff

It is certified that error appears in the above-identified patent and that said Letters Patent is hereby corrected as shown below:

The title page showing the illustrative Figure should be deleted and substitute therefore the attached title page.

In the drawings, Sheets 1, 3 and 6, should be deleted to be replaced the attached Sheets 1, 3 and 6, as shown on the attached pages.

Signed and Sealed this

Eighteenth Day of April, 2000

Attest:

Q. TODD DICKINSON

*Attesting Officer*   *Director of Patents and Trademarks*

United States Patent
Sudhoff

[11] Patent Number: 5,943,229
[45] Date of Patent: Aug. 24, 1999

[54] SOLID STATE TRANSFORMER

[75] Inventor: Scott D. Sudhoff, W. Lafayette, Ind.

[73] Assignee: ABB Power T&D Company Inc., Raleigh, N.C.

[21] Appl. No.: 09/089,063

[22] Filed: Jun. 2, 1998

[51] Int. Cl.⁶ .................................................. H02M 7/00
[52] U.S. Cl. .................................................. 363/125
[58] Field of Search .......................... 363/84, 89, 125, 363/127; 323/355, 361; 336/170, 171, 214, 215

[56] References Cited

U.S. PATENT DOCUMENTS

| | | | |
|---|---|---|---|
| 3,798,497 | 3/1974 | Manske | 315/28 |
| 4,024,565 | 5/1977 | Anthony et al. | 357/51 |
| 4,071,378 | 1/1978 | Anthony et al. | 148/1.5 |
| 4,204,237 | 5/1980 | Zocholl | 361/36 |
| 5,038,081 | 8/1991 | Maiale, Jr. et al. | 315/291 |
| 5,119,285 | 6/1992 | Liu et al. | 363/127 |
| 5,202,644 | 4/1993 | Poulsen | 336/5 |
| 5,270,910 | 12/1993 | Kile | 362/216 |
| 5,353,494 | 10/1994 | Bisbee et al. | 29/605 |
| 5,510,679 | 4/1996 | Maiale, Jr. et al. | 315/194 |
| 5,566,443 | 10/1996 | Allan et al. | 29/606 |

OTHER PUBLICATIONS

Henze, C.P. et al., "A Digitally Controlled AC to DC Power Conditioner That Draws Sinusoidal Input Current", *IEEE*, 1986, 531–540.

Reischl, P., *Proof Principle of the Solid State Transformer*, EPRI TR–105069, Project 8001–13, Final Report, 1995.

Venkataramanan, G. et al., "AC-AC Power Converters for Distribution Control", *NSF Symposium on Electric Power Systems Infrastructure*, Washington State University, Pullman, Washington, Oct. 27–29, 1994, pp. 159–162.

*Primary Examiner*—Matthew Nguyen
*Attorney, Agent, or Firm*—Woodcock Washburn Kurtz Mackiewicz & Norris LLP

[57] ABSTRACT

A solid state transformer having an input stage operatively coupled to an isolation stage. The input stage converts a high voltage, single phase AC input voltage to a plurality of unisolated DC output voltages. Each unisolated DC output voltage is at a voltage level which is less than the voltage level of the AC input voltage and each of the unisolated DC output voltages is separately isolated in the isolation stage.

24 Claims, 6 Drawing Sheets